(12) United States Patent
Huang et al.

(10) Patent No.: US 10,067,704 B2
(45) Date of Patent: Sep. 4, 2018

(54) METHOD FOR OPTIMIZING STORAGE CONFIGURATION FOR FUTURE DEMAND AND SYSTEM THEREOF

(71) Applicant: ProphetStor Data Services, Inc., Taichung (TW)

(72) Inventors: Ming Jen Huang, Taichung (TW);
Chun Fang Huang, Taichung (TW);
Tsung Ming Shih, Taichung (TW);
Wen Shyen Chen, Taichung (TW)

(73) Assignee: ProphetStor Data Services, Inc., Taichung (TW)

( * ) Notice: Subject to any disclaimer, the term of this patent is extended or adjusted under 35 U.S.C. 154(b) by 331 days.

(21) Appl. No.: 14/503,440

(22) Filed: Oct. 1, 2014

(65) Prior Publication Data
US 2016/0098225 A1   Apr. 7, 2016

(51) Int. Cl.
*G06F 3/00*    (2006.01)
*G06F 3/06*    (2006.01)

(52) U.S. Cl.
CPC .......... *G06F 3/0635* (2013.01); *G06F 3/0608* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 8,239,584 B1* | 8/2012 | Rabe | G06F 3/0605 710/8 |
| 2002/0046299 A1* | 4/2002 | Lefeber | H04L 29/06 719/318 |
| 2002/0103954 A1* | 8/2002 | Karamanolis | H04L 29/06 710/105 |
| 2005/0071599 A1* | 3/2005 | Modha | G06F 9/5016 711/170 |
| 2006/0116981 A1* | 6/2006 | Krimmel | G06F 11/3476 |
| 2012/0089726 A1* | 4/2012 | Doddavula | H04L 67/34 709/224 |
| 2014/0115579 A1* | 4/2014 | Kong | G06F 3/0605 718/1 |

* cited by examiner

*Primary Examiner* — David Yi
*Assistant Examiner* — Craig S Goldschmidt
(74) *Attorney, Agent, or Firm* — Che-Yang Chen; Law Offices of Scott Warmuth

(57) ABSTRACT

A method for optimizing storage configuration for future demand and a system applying the method are disclosed. The system includes a monitoring module, a storage recording module, a traffic modeling module, a rule-based decision module, and a storage management module. With performance values and utilization values provided from the monitoring module, a traffic status of data access in a particular time in the future can be generated. Then, a storage configuration with the workload requirement according to some rules can be available. The storage configuration is implemented to fulfill the requirement of the traffic status of data access.

20 Claims, 6 Drawing Sheets

| Classification | No. | Content of Requirement or Rule |
|---|---|---|
| Workload Requirement | R1 | iops=1500K |
| | R2 | needing_snapshot |
| Configuration Rules | CR1 | IF iops<4000K THEN hdd2_vol1 |
| | CR2 | IF iops≥4000K THEN no_sn4000K |
| | CR3 | IF needing_snapshot THEN hdd2_vol1 |
| | CR4 | IF needing_dedup THEN no_dedup |
| Action Rules | AR1 | IF iops<4000K AND having_node(x) THEN using_node(x) ELSE no_sn<4000K |
| | AR2 | IF iops<4000K AND no_sn4000 THEN iops=2000K |
| | AR3 | IF iops≥4000K and having_node (x) THEN x ELSE no_sn4000K |
| | AR4 | IF iops≥4000K AND no_sn4000 THEN alarming (no_sn4000K) |
| | AR5 | IF needing_snapshot AND having_node(x) THEN using_node(x) ELSE no_snapshot |
| | AR6 | IF needing_snapshot AND no_snapshot THEN alarming (no_snapshot) |
| | AR7 | IF needing_dedup AND no_dedup THEN alarming (no_dedup) |

| Classification | No. | Content of Requirement or Rule |
|---|---|---|
| Workload Requirement | R1 | iops=1500K |
| | R2 | needing_snapshot |
| Configuration Rules | CR1 | IF iops<4000K THEN hdd2_vol1 |
| | CR2 | IF iops≥4000K THEN no_sn4000K |
| | CR3 | IF needing_snapshot THEN hdd2_vol1 |
| | CR4 | IF needing_dedup THEN no_dedup |
| Action Rules | AR1 | IF iops<4000K AND having_node(x) THEN using_node(x) ELSE no_sn<4000K |
| | AR2 | IF iops<4000K AND no_sn4000 THEN iops=2000K |
| | AR3 | IF iops≥4000K and having_node (x) THEN x ELSE no_sn4000K |
| | AR4 | IF iops≥4000K AND no_sn4000 THEN alarming (no_sn4000K) |
| | AR5 | IF needing_snapshot AND having_node(x) THEN using_node(x) ELSE no_snapshot |
| | AR6 | IF needing_snapshot AND no_snapshot THEN alarming (no_snapshot) |
| | AR7 | IF needing_dedup AND no_dedup THEN alarming (no_dedup) |

Fig. 3

| Classification | No. | Content of Requirement or Rule |
|---|---|---|
| Workload Requirement | R1 | iops=1500K |
| | R2 | needing_snapshot |
| | R3 | cost≤1000 |
| Configuration Rules | CR1 | IF iops<4000K THEN hdd2_vol1 |
| | CR2 | IF iops>4000K THEN ssd3_vol2 |
| | CR3 | IF needing_snapshot THEN hdd2_vol1 |
| | CR4 | IF needing_dedup THEN no_dedup |
| | CR5 | IF cost≤1000 THEN hdd2_vol1 |
| | CR6 | IF 1000<cost≤4000 THEN ssd3_vol2 |
| Action Rules | AR1 | IF iops<4000K AND having_node(x) THEN using_node(x) ELSE no_sn<4000K |
| | AR2 | IF iops<4000K AND no_sn4000 THEN iops=2000K |
| | AR3 | IF iops≥4000K and having_node (x) THEN x ELSE no_sn4000K |
| | AR4 | IF iops≥4000K AND no_sn4000 THEN alarming (no_sn4000) |
| | AR5 | IF needing_snapshot AND having_node(x) THEN using_node(x) ELSE no_snapshot |
| | AR6 | IF needing_snapshot AND no_snapshot THEN alarming (no_snapshot) |
| | AR7 | IF needing_dedup AND no_dedup THEN alarming (no_dedup) |
| | AR8 | IF 1000<cost≤4000 AND having_node(x) THEN using_node(x) ELSE no_elcost1000 |

Fig. 4

| Classification | No. | Content of Requirement or Rule |
|---|---|---|
| Workload Requirement | R1 | iops=1000K |
| | R2 | iops=5000K |
| | R3 | needing_snapshot |
| | R4 | total_cost≤3000 |
| Configuration Rules | CR1 | IF iops<4000K THEN hdd2_vol1 |
| | CR2 | IF iops<4000K THEN hdd2_vol2 |
| | CR3 | IF iops≥4000K THEN ssd3_vol3 |
| | CR4 | IF needing_snapshot THEN hdd2_vol1 |
| | CR5 | IF needing_snapshot THEN hdd2_vol2 |
| | CR6 | IF needing_snapshot THEN ssd3_vol3 |
| | CR7 | IF hdd2_vol1 AND total_cost≤x THEN CAL_TOC(hdd2_vol1,1000,x) |
| | CR8 | IF hdd2_vol2 AND total_cost≤x THEN CAL_TOC(hdd2_vol2,1500,x) |
| | CR9 | IF ssd3_vol3 AND total_cost≤x THEN CAL_TOC(ssd3_vol3,2000,x) |
| Action Rules | AR1 | IF iops<4000K AND having_node(y) AND total_cost≤t AND TOC(y,t) THEN using_node(x) ELSE no_sn<4000K |
| | AR2 | IF iops<4000K AND no_sn4000 THEN iops=2000K |
| | AR3 | IF iops≥4000K and having_node (x) THEN x ELSE no_sn4000K |
| | AR4 | IF iops≥4000K AND no_sn4000 THEN alarming (no_sn4000K) |
| | AR5 | IF needing_snapshot AND having_node(x) THEN using_node(x) ELSE no_snapshot |
| | AR6 | IF needing_snapshot AND no_snapshot THEN alarming (no_snapshot) |
| | AR7 | IF needing_dedup AND no_dedup THEN alarming (no_dedup) |
| | AR8 | IF 1000<cost≤4000 AND having_node(x) THEN using_node(x) ELSE no_elcost1000 |

Fig. 5

METHOD FOR OPTIMIZING STORAGE CONFIGURATION FOR FUTURE DEMAND AND SYSTEM THEREOF

FIELD OF THE INVENTION

The present invention relates to a method and a system for storage configuration. More particularly, the present invention relates to a method and a system for optimizing storage configuration for future demand.

BACKGROUND OF THE INVENTION

In data centers or enterprises, IT team members always provide more storage resources than their system needs. Usually, a cluster of spindles (Hard Disk Drive, HDD), all-flash-array (Solid-State Disk, SSD), or a hybrid of HDDs and SSDs dedicated to a workload, e.g. Virtual Desktop Infrastructure (VDI), are prepared. Over-provisioning of the storages mentioned above is just for unpredictable peaks of performance or growth of users. Storages dedicated for one workload may cause a waste of large portion of unused storage capacity and money spent on the "imaginative" peak performance which may not happen. Therefore, enterprises or cloud service providers have difficulties in budget planning and choosing the right configuration for their storage system.

A solution for the above problem is provided in the U.S. Pat. No. 8,706,962. A method of configuring a multi-tiered storage system is disclosed. The storage system comprises a number of storage tiers and each of the storage tiers includes storage devices of a particular type of storage. Data access information for storage extents (a small portion of a storage volume) to be stored in the storage system is received. Resource information for available storage tiers in the storage system to place the storage extents on is also received. A cost incurred by the storage system for placing each of the storage extents on each of the storage tiers is determined. The cost is based on a consumption of storage resources for storing a storage extent in a storage tier and calculated using the data access and resource information. Each storage extent is assigned to a particular one of the storage tiers that would incur the lowest cost to the storage system for storing the storage extent. For each storage tier, a minimum number of storage devices are selected, within the assigned storage tier. That would satisfy data access and capacity requirements for all storage extents assigned to that tier.

The method of '962 is to find out a minimum cost if one storage extent is stored. Under the cost, a combination of storage devices is selected for used. It is an economic way to utilize available storages. However, it doesn't mean that a storage system run by the method can save the most money. Fluctuation of use of the storage system in the future is unpredicted. Purchase of storages is till conservative such that a large unnecessary portions of storages will still be reserved.

Hence, a method or a system for optimizing storage configuration for future is desired. Preferably, the method or a system may provide a plan to allocate just-enough resources of storage in a period of time in the future. Once current storage infrastructure could not satisfy requirements in the period of time in the future, warning message can be provided to the IT team members and a recommended plan for new storage procurement can be available as well.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a system for optimizing storage configuration is disclosed. The system includes: a monitoring module, electrically connected to a workload host and a storage system, for collecting performance values and utilization values from the workload host and/or the storage system having a plurality of storage nodes, and scanning feature information from each of the storage node; a storage recording module, electrically connected to the monitoring module, for storing the performance values and utilization values from the monitoring module or by manual update, and providing the stored performance values and utilization values; a traffic modeling module, electrically connected to the storage recording module, for providing a traffic status of data access in a particular time in the future according to the performance values and utilization values from the storage recording module; a rule-based decision module, electrically connected to the traffic modeling module, for providing rules determining mapping of a workload requirement to a storage configuration of the storage system; and a storage management module, electrically connected to the rule-based decision module and the storage system, for providing one workload requirement from the workload host to the rule-based decision module and performing one storage configuration to the storage system according to the rule provided from the rule-based decision module.

According to the present invention, the storage nodes are Hard Disks (HDDs), Solid State Drives (SSDs), or a combination of HDD(s) and SSD(s). Therefore, the storage configuration can be one of a specific HDD, a specific SSD, a combination of HDDs, a combination of SSDs and a combination of HDDs and SSDs. The storage nodes have at least two different specifications. The performance value mentioned above may be read/write Input/output Operations Per Second (IOPS), read/write latency, read/write throughput, or read/write cache hit. The utilization value may be free size in a storage node in the storage system or Central Processing Unit (CPU) load of the workload host.

Preferably, the workload requirement comprises current and future performance values, current and future utilization values, and data services. The data service is to process snapshots of a portion or all of one storage node, quality of service of operation of the storage system, replication of data in one storage node, deduplication of data in one storage node, and compression of data in one storage node. The feature information comprises online status of each storage node, offline status of each storage node, property of snapshots of a portion or all of one storage node, quality of service of operation of the storage system, property of replication of data in one storage node, property of deduplication of data in one storage node, and property of compression of data in one storage node.

In detail, the rule-based decision module further has a database with specifications and costs for all storage nodes, and provides a total cost of one storage configuration. The storage management module further provides a procurement plan for extra storage nodes that are required to complement a gap between the traffic status of data access in a particular time in the future and the maximum capacity currently storage configuration in the storage system can provide.

In order to provide a warning signal, the storage management module further alarms when the traffic status of data access in a particular time in the future exceeds the maximum capacity that all storage nodes in the storage system or currently set storage configuration can provide.

It should be noticed that the monitoring module, the storage recording module, the traffic modeling module, the rule-based decision module, or the storage management module is a physical device or a software running in at least one server. Some or all of the monitoring module, the storage recording module, the traffic modeling module, the rule-based decision module, and the storage management module can be installed in a single server. Communication between two connected modules is achieved by Inter-Process Communication (IPC) such as Remote Procedure Call (RPC).

According to the present invention, the rule mentioned above is manually created and/or provided by the rule-based decision module. In some embodiments, a preset threshold value for each performance value or utilization value is provided so that when one monitor performance value or utilization value exceeds the corresponding preset threshold value, the traffic modeling module initiates a new process to provide a traffic status of data access in a particular time in the future and the storage management module performs one storage configuration to the storage system according to a new rule provided from the rule-based decision module. When the monitoring module scans and discovers new feature information, the traffic modeling module initiates a new process to provide a traffic status of data access in a particular time in the future and the storage management module performs one storage configuration to the storage system according to a new rule provided from the rule-based decision module. When the feature information is further provided manually, the traffic modeling module initiates a new process to provide a traffic status of data access in a particular time in the future and the storage management module performs one storage configuration to the storage system according to a new rule provided from the rule-based decision module.

The rule-based decision module can further includes units as: a workload requirement managing unit, for receiving the workload requirement; an action rule generating unit, for creating rules defining the mapping of a workload requirement to a storage configuration of the storage system, a configuration rule generating unit, for creating rules defining the mapping of storage properties to storage nodes of the storage system, and a rule matching unit, connecting to the workload requirement managing unit, the action rule generating unit and the configuration rule generating unit, for determining the mapping of the received workload requirement to the rules.

According to an aspect of the present invention, a method for optimizing storage configuration is disclosed. The method includes the steps of: collecting storage feature information from a storage system; monitoring performance values and utilization values from the storage system and a host; storing the performance values and utilization values; generating a traffic status of data access in a particular time in the future according to the performance values and utilization values; mapping a storage configuration with the workload requirement according to rules; checking if the existing storage nodes meet the requirement of the traffic status of data access in a particular time in the future; re-configuring the existing storage nodes by the storage configuration if the existing storage nodes don't meet the requirement of the traffic status of data access in the particular time in the future; and alarming that the existing storage nodes need to be upgraded or extra storage nodes need to be added in the particular time in the future if the existing storage nodes don't meet the requirement of traffic status of data access in the particular time in the future. Preferably, a last step can be recommending a plan of extra storages added to the existing storage nodes or adding new storage nodes to meet the requirement of traffic status of data access in the particular time in the future.

BRIEF DESCRIPTION OF THE DRAWINGS

FIG. 3 shows a table listing workload requirements and rules.

FIG. 4 shows another table listing workload requirements and rules.

FIG. 5 shows still another table listing workload requirements and rules.

DETAILED DESCRIPTION OF THE PREFERRED EMBODIMENTS

Figure 1:
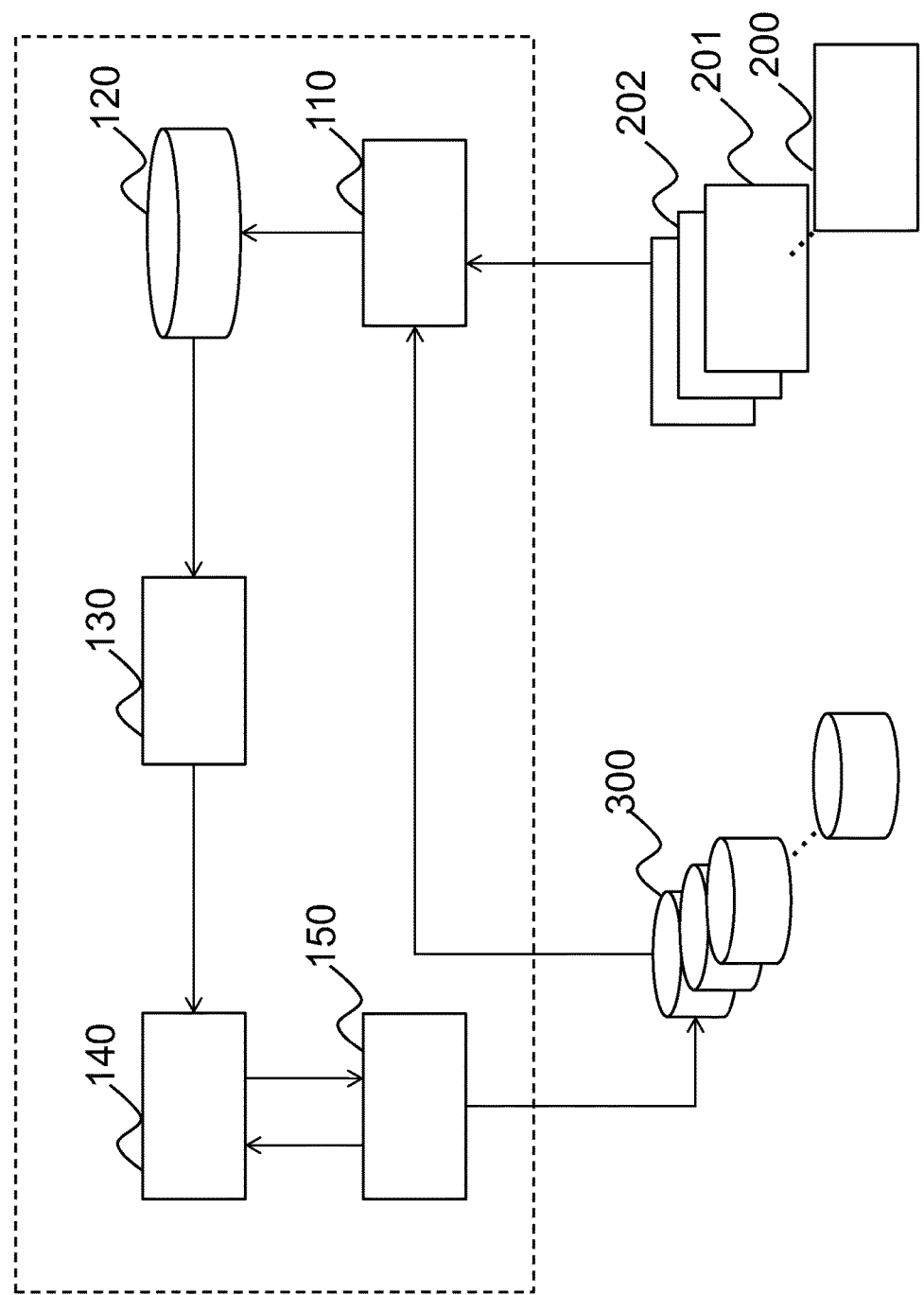
FIG. 1 shows a storage configuring system according to the present invention.
Figure 2:
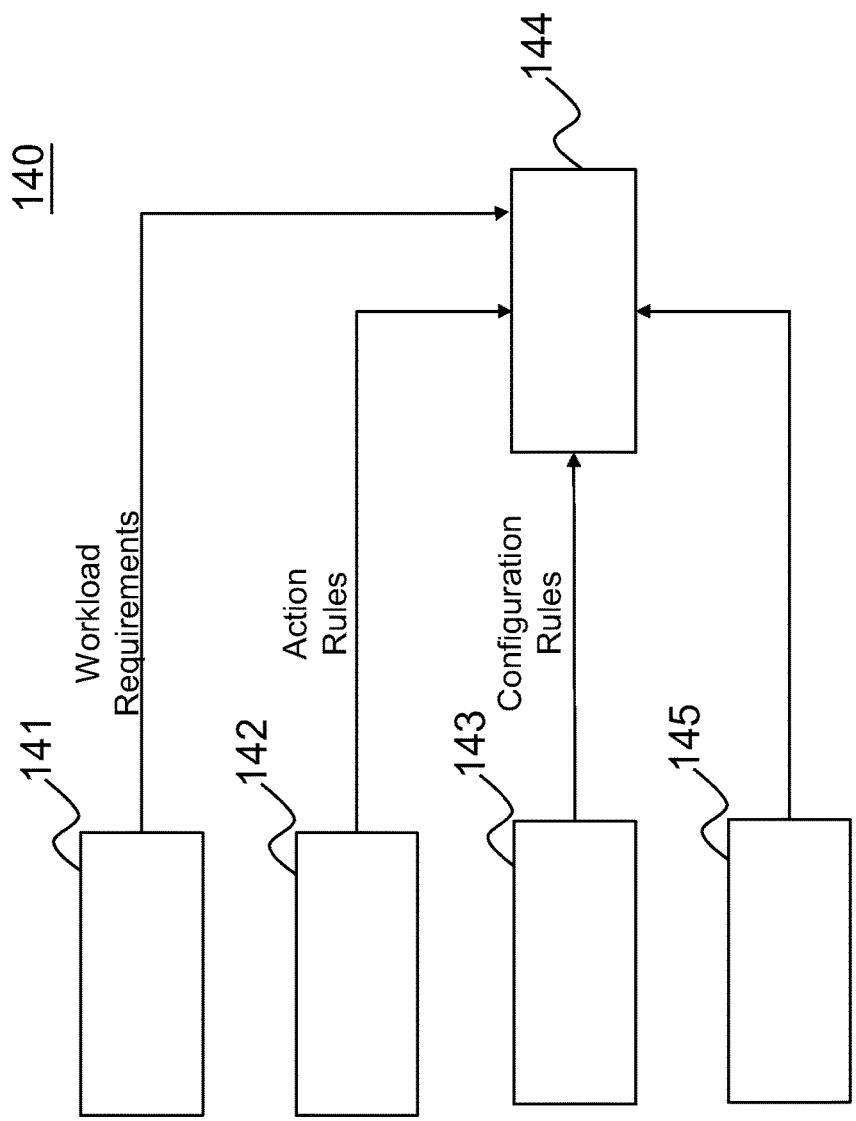
FIG. 2 illustrates a detailed structure of a rule-based decision module in the storage configuring system.

The present invention will now be described more specifically with reference to the following embodiments.

Please refer to FIG. 1 to FIG. 5. An embodiment of the present invention is disclosed. A storage configuring system 100 is capable of optimizing storage configuration of a storage system 300. The storage system 300 includes a number of storage nodes. The storage nodes may be Hard Disks (HDDs). Since the storage system 300 is prepared for the requirement from workload hosts for cloud services, the storage nodes may be Solid State Drives (SSDs), or even a combination of HDD(s) and SSD(s) if better performance is requested in a Service Level Agreement (SLA). In this embodiment, storage nodes of HDDs and SSDs in the storage system 300 will be introduced. The number or characteristics of the HDDs and SSDs may vary depending on different examples.

Preferably, the storage system 300 is a software-defined storage. Software defined storage refers to computer data storage technologies which separate storage hardware from the software that manages the storage infrastructure. The software enabling a software defined storage environment provides policy management for feature options, such as deduplication, replication, thin provisioning, snapshots, and backup. Therefore, logically, the configuration of storage nodes may support many aspects of data accesses. Even though the storage nodes are the same devices (HDD or SSD), they may have different specifications, e.g., at least two specifications. Some of them may have storage capacity of 1 TB while other may be 2 TB. It has nothing to do with manufacturers as long as the communication specifications for every storage nodes from different manufacturers are unified and accepted to the storage system 300.

The storage configuring system 100 has five main parts. They are a monitoring module 110, a storage recording module 120, a traffic modeling module 130, a rule-based decision module 140, and a storage management module 150. The modules may be a physical device, such as a server. They can also be software running in at least one server (workload host) or more. The latter is applied in the present embodiment. The five modules can be installed in one server to function. They can also be separated into several individual servers while two or more modules can be in the same server. The way the modules are located is not limited by the present invention. Functions of each module will be introduced sequentially.

The monitoring module 110 is electrically connected to workload hosts 200, 201, and 202 and the storage system 300. Here, a number of workload hosts are used to provide a certain cloud service, including different workloads, such as Virtual Desktop Infrastructure (VDI) or Oracle database. The monitoring module 110 can collect performance values and utilization values from the workload host 200, 201, or 202 and/or the storage system 300. The performance value refers to a real data which can be obtained when the workload hosts access the storage system 300. Typically, the performance value can be read/write Input/output Operations Per Second (IOPS), read/write latency, read/write throughput, or read/write cache hit. One or some of the performance values can be received by the monitoring module 110 for further computing. The utilization value is a measurement of current status of hardware of the storage system 300 and workload hosts 200, 201, and 202. For example, the utilization value can be the free size in a storage node in the storage system 300 or Central Processing Unit (CPU) load of the workload host 202. Not like the performance value, the utilization value should be collected as comprehensive as possible. Once there is any change of the utilization value or the performance value, or one of the two values exceeds a preset threshold value, the traffic modeling module 130 initiates a new process to provide a traffic status of data access in a particular time in the future and the storage management module 150 performs one storage configuration to the storage system 300 according to a new rule provided from the rule-based decision module 140. This will be illustrated in details later.

The monitoring module 110 also processes to scan feature information from each of the storage node. The feature information includes, but not limited to, online status of each storage node, offline status of each storage node, property of snapshots of a portion (volume) or all of one storage node, quality of service of operation of the storage system 300, property of replication of data in one storage node, property of deduplication of data in one storage node, and property of compression of data in one storage node. "Property" means whether or not the storage node can provide related service. Namely, if a storage node has the property, then the service can be provided. The feature information is obtained so that an overall running status of the storage system 300 can be available and a decision for future operation can refer to the feature information.

The storage recording module 120 is electrically connected to the monitoring module 110. It stores the performance values and utilization values from the monitoring module 110. It can also receive and store the performance values and utilization values which are manually updated. The performance values and utilization values can be manually updated (maybe by IT team members) just in case there are incomplete data due to connection error between modules but can still be found by someone who supervises the storage system 300, or some historical or empirical data which can be provided. The storage recording module 120 can also provide the stored performance values and utilization values.

The traffic modeling module 130 is electrically connected to the storage recording module 120. It can provide a traffic status of data access in a particular time in the future according to the performance values and utilization values from the storage recording module 120. The traffic status of data access is a forecasted performance value in the particular time in the future. Since the performance value is a key value to check if future requirement of the workload can be fulfilled by current storage configuration, how to get the trusted and forecasted performance values is very important. For example, the traffic status of data access may be IOPS in any time after 5 minutes. However, the traffic status of data access must be available from collecting historically accumulated IOPS and analyzing them. Any suitable methods, algorithms, or modules that provide such service can be applied. It is best to utilize a storage traffic modeling system provided by the same inventor in U.S. patent application Ser. No. 14/290,533 which is herein incorporated by reference in its entirety.

The rule-based decision module 140 is electrically connected to the traffic modeling module 130. It is in charge of providing rules that determine mapping of a workload requirement to a storage configuration of the storage system 300. The rule is manually created by IT team members and/or automatically generated by itself according to available feature information. Workload requirement includes current and future performance values, current and future utilization values, and data services. Data service is a requirement from the workload host 200, 201, or 202 that the storage system 300 can support. For example, the data service is to process snapshots of a portion (volume) or all of one storage node, fulfilling quality of service of operation of the storage system 300, replication of data in one storage node, deduplication of data in one storage node, and compression of data in one storage node. The storage configuration refers to a specific HDD, a specific SSD, a combination of HDDs, a combination of SSDs, or a combination of HDDs and SSDs.

The rule-based decision module 140 is further composed of four main units. Please see FIG. 2. They are a workload requirement managing unit 141, an action rule generating unit 142, a configuration rule generating unit 143, and a rule matching unit 144. The workload requirement managing unit 141 receives the workload requirements from the workload host 200, 201 and/or 202 and passes the workload requirements to the rule matching unit 144. The action rule generating unit 142 can create rules which defines the mapping of a workload requirement to a storage configuration of the storage system. In the initiating stage, action rules are defined by IT team members by using policy editor. Then, they are automatically generated by the action rule generating unit 142. The configuration rule generating unit 143 can create rules that defining the mapping of storage properties to storage nodes of the storage system 300. The rule matching unit 144 is connected to the workload requirement managing unit 141, the action rule generating unit 142, and the configuration rule generating unit 143. It can determine the mapping of the received workload requirement to the rules. The "received workload requirement" is different from the workload requirement mapped by the action rule generating unit 142. The latter is just a preset condition that the "received workload requirement" would be. An example is illustrated below showing how the rule-based decision module 140 operates.

Please see FIG. 3. FIG. 3 is a table for listing workload requirements and rules are applied in the example. As mentioned above, there are two kinds of rules from separate units. They are defined as configuration rules and action rules, respectively. As shown in FIG. 3, workload host 200 requests workload requirements R1 and R2. R1 means the workload host 200 requests a storage which has performance of IOPS of 1500 while R2 means that the storage with a property of snapshot capability. Configuration rules created by the IT staff member at an early stage are CR1 to CR4. CR1 means if a workload requirement is IOPS<4000, then the volume 1 of the HDD2 is provided for the requirement. CR2 means if a workload requirement is IOPS≥4000, then no snapshots for IOPS≥4000 is provided. CR3 means if a workload requirement needs snapshots, then the volume 1 of the HDD2 is provided for the requirement. CR4 means if a workload requirement needs deduplication, then no deduplication is provided. Relatively, action rules created from the action rule generating unit 142 are AR1 to AR7. AR1 means if a workload requirement is IOPS<4000 and a storage node is ready, then a function is selected to use the storage, or else no snapshots for IOPS<4000 is provided. AR2 means if a workload requirement is IOPS<4000 and no snapshots for IOPS<4000 is provided, then IOPS is set to be 2000. AR3 means if a workload requirement is IOPS≥4000 and a storage node is ready, then nothing has to be changed, or else no snapshots for IOPS≥4000 is provided. AR4 means if a workload requirement is IOPS≥4000 and no snapshots for IOPS≥4000 is provided, then alarm that there is no snapshots for IOPS≥4000. AR5 means if a workload requirement needs snapshots and a storage node is ready, then a function is selected to use the storage, or else no snapshots is provided. AR6 means if a workload requirement needs snapshots and no snapshots is provided, then alarms that there is no snapshot service. AR7 means if a workload requirement needs deduplication and no deduplication is provided, then alarms that there is no deduplication service.

The workload requirements from the workload host 200 are added as knowledge. The knowledge triggers the rules. Therefore, CR1 and CR3 are triggered. Then, action rules of AR1 and AR5 are triggered. The rule-based decision module 140 requests the storage management module 150 to change current storage configuration with the volume 1 of the HDD2 added, which has snapshot capability.

The rule-based decision module 140 further has a database 145 with specifications and costs for all storage nodes. The database 145 can also provide a total cost of requested storage nodes in a storage configuration. Another example showing how the rule-based decision module 140 operates is illustrated below.

Please refer to FIG. 4. FIG. 4 is a table for listing workload requirements and rules applied in another example. This table is amended from that in FIG. 3 while database 145 is online functioning. Different from the previous example, the workload host 200 requests workload requirements R3 that a storage used should have cost less than or equal to USD 1000 while R1 and R2 remain the same. Accordingly, the configuration rules are amended and added as CR2: if a workload requirement is IOPS≥4000, then the volume 2 of the SSD3 is provided for the requirement; CR5: if a cost required for a storage is less than or equal to USD 1000, then the volume 1 of the HDD2 is provided for the requirement; and CR6: if a cost required for a storage is less than or equal to USD 4000, then volume 2 of the SSD3 is provided for the requirement. Meanwhile, the action rule generating unit 142 creates another action rule, AR8. AR8 describes that if a workload requirement requires a storage greater than USD 1000 and less than or equal to USD 4000 and a storage node is ready, then a function is selected to use the storage, or else no solution for cost less than or equal to USD 1000 is provided.

Obviously, CR1, CR3 and CR5 are triggered. The volume 1 of the HDD2 is able to take care of these workload requirements. However, the volume 1 of the HDD2 is picked but no action done here. Then, AR1, AR5, and AR8 are triggered. The volume 1 of the HDD2 is selected by the function in AR1, AR5, and AR8.

Since the storage configuring system 100 can deal with more than two workload requirements at the same time, another example of how it works is shown in FIG. 5. In this example, now, two workloads have workload requirements R1 and R2, respectively. R1 requests a storage which has performance of IOPS of 1000 while R2 requests performance of IOPS of 5000. However, both of the two workloads need snapshots (R3) and a total cost of the two should be less than or equal to USD 3000 (R4).

The configuration rules are changed significantly to fulfill multi-workloads. As one can see, CR1 means if a workload requirement is IOPS<4000, then the volume 1 of the HDD2 is provided for the requirement. CR2 means if a workload requirement is IOPS<4000, then the volume 2 of the HDD2 is provided for the requirement. CR3 means if a workload requirement is IOPS≥4000, then the volume 3 of the SSD3 is provided for the requirement. CR4 to CR6 refer to that if a workload requirement needs snapshots, then the volume 1 of the HDD2, the volume 2 of the HDD2 and the volume 3 of the SSD3 can all be provided for the requirement. CR7 means if the volume 1 of the HDD2 is selected and the total cost is requested by one workload requirement, then the cost of the volume 1 of the HDD2 is USD 1000. CR8 means if the volume 2 of the HDD2 is selected and the total cost is requested by one workload requirement, then the cost of the volume 2 of the HDD2 is USD 1500. CR9 means if the volume 3 of the SSD3 is selected and the total cost is requested by one workload requirement, then the cost of the volume 3 of the SSD3 is USD 2000. For the action rules, only AR1 is amended. New AR1 says that if IOPS<4000 is requested, another storage node is selected and ready to be combined as a storage configuration, a maximum of total cost is given, and the cost of the storage configuration is still within the maximum of the total cost, then the one can be used with the selected one, or else no snapshots for IOPS<4000 is provided.

Again, it is obvious that all the configuration rules are triggered. All of the volume 1 of the HDD2, the volume 2 of the HDD2, and the volume 3 of the SSD3 are qualified for the requirement R1, R2, and R3. Meanwhile, the action rules AR1, AR5 and AR8 are triggered, too. However, at this stage, the volume 2 of the HDD2 is not qualified. Because the volume 3 of the SSD3 is a must pick for R2, only one of the volume 1 of the HDD2 and the volume 2 of the HDD2 should be used to fulfill R1. Since the total cost of the volume 2 of the HDD2 and the volume 3 of the SSD3, USD 3500, is greater than the maximum of the total cost, USD 3000, the storage configuration is set to be the volume 1 of the HDD2 and the volume 3 of SSD3 for the two workloads.

The storage management module 150 is electrically connected to the rule-based decision module 140 and the storage system 300. It can provide one workload requirement from the workload host 200, 201, and/or 202 to the rule-based decision module 140 to request a corresponding storage configuration to perform to the storage system 300 according to the rule provided from the rule-based decision module 140. As mentioned above, the storage configuration will be done according to the action rules AR1, AR5, and AR8.

Due to the database 145, the storage management module 150 can further provide a procurement plan for extra storage nodes that are required to complement a gap between the traffic status of data access in a particular time in the future and the maximum capacity currently storage configuration in the storage system 300 can provide. For example, if the traffic modeling module 130 forecasts that IOPS required hours later is 5000 while current storage configuration can only support IOPS of 4000 or less, a procurement plan as a solution for this requirement is proposed. As well, the storage management module 150 alarms when the traffic status of data access in a particular time in the future exceeds the maximum capacity that all storage nodes in the storage system 300 or currently set storage configuration can provide. The alarming can be set as an action rule. It should be noticed that a connection between any two connected modules mentioned above is achieved by Inter-process communication (IPC) such as Remote Procedure Call (RPC).

In another embodiment, there are some interactive modes disclosed. A preset threshold value for each performance value or utilization value is provided. Thus, when one monitor performance value or utilization value exceeds the corresponding preset threshold value, the traffic modeling module 130 initiates a new process to provide a traffic status of data access in a particular time in the future. The storage management module 150 performs one storage configuration to the storage system 300 according to a new rule provided from the rule-based decision module 140. If the monitoring module 110 scans and discovers new feature information, the traffic modeling module 130 initiates a new process to provide a traffic status of data access in a particular time in the future and the storage management module 150 performs new storage configuration to the storage system 300 according to a new rule provided from the rule-based decision module 140. In addition, when the feature information is further manually provided by the IT team members, the traffic modeling module 130 initiates a new process to provide a traffic status of data access in a particular time in the future and the storage management module 150 performs a new storage configuration to the storage system according to a new rule provided from the rule-based decision module 140.

Figure 6:
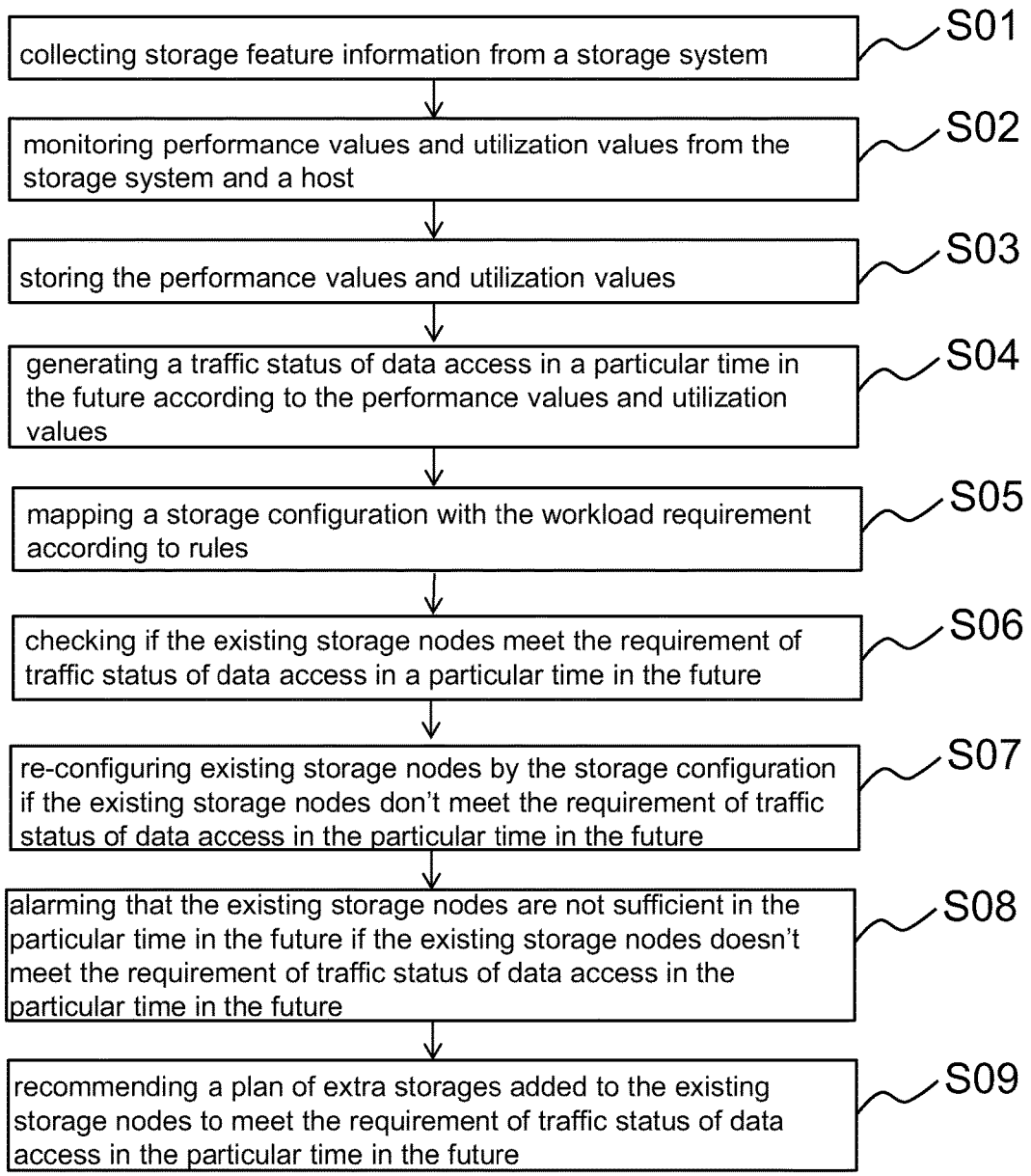
FIG. 6 is a flowchart of a method for optimizing storage configuration.

It is clear from the above that the embodiments show a physical system to have optimizing storage configuration for future requirement. A method for achieving the same goal can be derived. Please refer to FIG. 6. FIG. 6 is a flowchart of a method for optimizing storage configuration. With reference to the description above, the several steps of the method is illustrated. First, collect storage feature information from a storage system 300 (S01). Then, monitor performance values and utilization values from the storage system 300 and a host (workload host 200, 201 and/or 203) (S02). Store the performance values and utilization values (S03). Generate a traffic status of data access in a particular time in the future according to the performance values and utilization values (S04). Then, map a storage configuration with the workload requirement according to the rules (S05). The rules may be manually updated by IT team members or created by the rule-based decision module 140. Check if the existing storage nodes meet the requirement of the traffic status of data access in a particular time in the future (S06). Then, re-configure the existing storage nodes by the storage configuration if the existing storage nodes don't meet the requirement of the traffic status of data access in the particular time in the future (S07). Next, alarm that the existing storage nodes need to be upgraded or extra storage nodes need to be added in the particular time in the future if the existing storage nodes don't meet the requirement of traffic status of data access in the particular time in the future (S08). Finally, recommend a plan of extra storages added to the existing storage nodes or adding new storage nodes to meet the requirement of traffic status of data access in the particular time in the future (S09).

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for optimizing storage configuration, comprising:
a monitoring module, electrically connected to a workload host and a storage system having a plurality of storage nodes of at least two different specifications to provide different data services, the plurality of storage nodes are arranged under a current storage configuration, wherein performance values, utilization values and feature information are collected from each of the storage nodes by the monitoring module;
a storage recording module, electrically connected to the monitoring module, wherein the performance values and utilization values are allowed to be manually updated and stored in the storage recording module;
a traffic modeling module, electrically connected to the storage recording module, wherein the traffic modeling module generates a prediction of a traffic status of data access in a particular time in the future calculated based on the stored performance values and utilization values to check if the traffic status of data access in the particular time fulfills a workload requirement under the current storage configuration;
a rule-based decision module, electrically connected to the traffic modeling module, wherein the rule-based decision module provides rules determining mapping of the workload requirement to a corresponding storage configuration and defining mapping of service capability to a corresponding storage node of the storage system based on the feature information which indicates capability of the plurality of storage nodes to provide snapshot service, data replication service, data deduplication service, and data compression service; and
a storage management module, electrically connected to the rule-based decision module and the storage system, wherein the storage management module provides the workload requirement from the workload host to the rule-based decision module and reconfigures the current storage configuration to the corresponding storage configuration according to the rules provided from the rule-based decision module while the workload requirement is not able to be fulfilled by the current storage configuration,
wherein the workload requirement comprises requirement of data service including snapshot service, data replication service, data deduplication service or data compression service.

2. The system according to claim 1, wherein the storage nodes are Hard Disks (HDDs), Solid State Drives (SSDs), or a combination of HDD(s) and SSD(s).

3. The system according to claim 1, wherein the storage configuration is a configuration of a specific HDD, a specific SSD, a combination of HDDs, a combination of SSDs or, a combination of HDD(s) and SSD(s).

4. The system according to claim 1, wherein the performance value is read/write Input/output Operations Per Second (IOPS), read/write latency, read/write throughput, or read/write cache hit.

5. The system according to claim 1, wherein the utilization value is free size in a storage node in the storage system or Central Processing Unit (CPU) load of the workload host.

6. The system according to claim 1, wherein the workload requirement further comprises current and future performance values, and current and future utilization values.

7. The system according to claim 1, wherein the feature information comprises online status of each storage node, offline status of each storage node, property of snapshots of a portion or all of one storage node, quality of service of operation of the storage system, property of replication of data in one storage node, property of deduplication of data in one storage node, and property of compression of data in one storage node.

8. The system according to claim 1, wherein the rule-based decision module further has a database with specifications and costs for all storage nodes, and provides a total cost of one storage configuration.

9. The system according to claim 8, wherein the storage management module further provides a procurement plan for extra storage nodes that are required to complement a gap between the traffic status of data access in a particular time in the future and the maximum capacity that current storage configuration in the storage system can provide.

10. The system according to claim 1, wherein the storage management module further alarms when the traffic status of data access in a particular time in the future exceeds the maximum capacity that all storage nodes in the storage system or currently set storage configuration can provide.

11. The system according to claim 1, wherein the monitoring module, the storage recording module, the traffic modeling module, the rule-based decision module, or the storage management module is a physical device or a software running in at least one server.

12. The system according to claim 1, wherein some or all of the monitoring module, the storage recording module, the traffic modeling module, the rule-based decision module, and the storage management module are installed in a single server.

13. The system according to claim 1, wherein a connection between two connected modules is achieved by Inter-process communication (IPC) such as Remote Procedure Call (RPC).

14. The system according to claim 1, wherein the rules are manually created and/or provided by the rule-based decision module.

15. The system according to claim 1, wherein a preset threshold value for each performance value or utilization value is provided so that when one monitored performance value or utilization value exceeds the corresponding preset threshold value, the traffic modeling module initiates a new process to provide a traffic status of data access in a particular time in the future and the storage management module performs one storage configuration to the storage system according to a new rule provided from the rule-based decision module.

16. The system according to claim 1, wherein when the monitoring module scans and discovers new feature information, the traffic modeling module initiates a new process to provide a traffic status of data access in a particular time in the future and the storage management module performs one storage configuration to the storage system according to a new rule provided from the rule-based decision module.

17. The system according to claim 1, wherein when the feature information is further provided manually, the traffic modeling module initiates a new process to provide a traffic status of data access in a particular time in the future and the storage management module performs one storage configuration to the storage system according to a new rule provided from the rule-based decision module.

18. The system according to claim 1, wherein the rule-based decision module further comprises:
 a workload requirement managing unit, for receiving the workload requirement;
 an action rule generating unit, for creating rules defining the mapping of a workload requirement to a storage configuration of the storage system,
 a configuration rule generating unit, for creating rules defining the mapping of service capability to storage nodes of the storage system, and
 a rule matching unit, connecting to the workload requirement managing unit, the action rule generating unit and the configuration rule generating unit, for determining the mapping of the received workload requirement to the rules.

19. A method for optimizing storage configuration, comprising the steps of:
 A. collecting storage feature information from a storage system having a plurality of storage nodes of at least two different specifications to provide different data services, the plurality of storage nodes are arranged under a current storage configuration, wherein the storage feature information indicates capability of the plurality of storage nodes to provide snapshot service, data replication service, data deduplication service, and data compression service;
 B. monitoring performance values and utilization values from the storage system and a host;
 C. storing the performance values and utilization values;
 D. predicting a traffic status of data access in a particular time in the future according to the stored performance values and utilization values;
 E. generating rules determining mapping of a workload requirement to a corresponding storage configuration and defining mapping of service capability to a corresponding storage node of the storage system based on the storage feature information;
 F. checking if the traffic status of data access in the particular time fulfills the workload requirement under the current storage configuration;
 G. re-configuring the current storage configuration to the corresponding storage configuration according to the rules and alarming that the storage nodes need to be upgraded or extra storage nodes need to be added in the particular time in the future while the workload requirement is not able to be fulfilled by the current storage configuration,
 wherein the workload requirement comprises requirement of data service including snapshot service, data replication service, data deduplication service or data compression service.

20. The method according to claim 19, further comprising a step H after the step G: recommending a plan of extra storages added to the storage nodes or adding new storage nodes to meet the requirement of traffic status of data access in the particular time in the future.

* * * * *